(12) United States Patent
Hu et al.

(10) Patent No.: US 11,993,016 B2
(45) Date of Patent: May 28, 2024

(54) RELEASE DEVICES AND PRINTING APPARATUSES

(71) Applicant: Shenzhen Anycubic Technology Co., Ltd., Shenzhen (CN)

(72) Inventors: Guiyuan Hu, Shenzhen (CN); Xin Ouyang, Shenzhen (CN)

(73) Assignee: SHENZHEN ANYCUBIC TECHNOLOGY CO., LTD., Shenzhen (CN)

( * ) Notice: Subject to any disclaimer, the term of this patent is extended or adjusted under 35 U.S.C. 154(b) by 37 days.

(21) Appl. No.: 17/518,253

(22) Filed: Nov. 3, 2021

(65) Prior Publication Data

US 2022/0161491 A1    May 26, 2022

(30) Foreign Application Priority Data

Nov. 25, 2020   (CN) .......................... 202022755657.2

(51) Int. Cl.
*B29C 64/245* (2017.01)
*B29C 64/321* (2017.01)
*B33Y 30/00* (2015.01)

(52) U.S. Cl.
CPC .......... *B29C 64/245* (2017.08); *B29C 64/321* (2017.08); *B33Y 30/00* (2014.12)

(58) Field of Classification Search
CPC ... B29C 64/245; B29C 64/321; B29C 64/223; B29C 64/124; B29C 64/307
See application file for complete search history.

(56) References Cited

U.S. PATENT DOCUMENTS

| 2018/0264724 A1* | 9/2018 | Feller .................... B29C 64/393 |
| 2020/0139619 A1* | 5/2020 | Prucha ................. B29C 64/232 |
| 2020/0298485 A1 | 9/2020 | Tsai |

FOREIGN PATENT DOCUMENTS

| CN | 212072971 U | 12/2020 |
| CN | 212555055 U | 2/2021 |
| WO | 2020168808 A1 | 8/2020 |

OTHER PUBLICATIONS

Extended European Search Report dated Apr. 7, 2022. European Application No. 21205793.9; applicant Shenzhen Anycubic Technology Co., Ltd.

* cited by examiner

*Primary Examiner* — Alison L Hindenlang
*Assistant Examiner* — Erica Hartsell Funk
(74) *Attorney, Agent, or Firm* — Bayramoglu Law Offices LLC (57) ABSTRACT

A release device and a printing apparatus are provided. The release device includes: a fixing member, a release film, a support plate, a soft rubber ring and an exhaust device. The fixing member is arranged to be fixed to the release film. The soft rubber ring is arranged between the release film and the support plate at edges of the release film and the support plate. A cavity is enclosed by the release film, the support plate, and the soft rubber ring together. The support plate is provided with a first through hole through which the exhaust device is in communication with the cavity. In this way, air in the cavity can be exhausted by the exhaust device, the release film can be attached downward to the support plate, a printing model can thus be smoothly released from the release film.

16 Claims, 5 Drawing Sheets

RELEASE DEVICES AND PRINTING APPARATUSES

CROSS REFERENCE TO THE RELATED APPLICATIONS

This application claims priority to Chinese Patent Application No. CN202022755657.2 filed on Nov. 25, 2020, entitled "OFF-TYPE DEVICES AND PRINTING EQUIPMENT", now published as Chinese publication No. CN214111508 dated Sep. 3, 2021, the entire contents of which are incorporated herein by reference.

TECHNICAL FIELD

The present disclosure relates to the technical field of printing, and more particularly to release devices and printing apparatuses.

BACKGROUND

Three-dimensional (3D) printing technology is a new type of rapid prototyping technology based on digital models, with models being manufactured by means of printing layer by layer and is a completely different modeling technology from traditional mold manufacturing. At present, in a printing process with a general 3D printing apparatus, every time the printing of a layer is completed, a printing assembly needs to be lifted by a certain height that must be greater than the thickness of the next layer such that a printing model can be completely released from a release film, and then the printing assembly is lowered to the height equal to the thickness of the next layer to continue to print the next layer. Every time the general printing apparatus completes the printing of a layer, the printing assembly needs to move up and down by a certain stroke before continuing to print.

SUMMARY

Embodiments of the present disclosure are to provide a release device and a printing apparatus, to solve the problem whereby every time a general printing apparatus completes the printing of a layer, a printing assembly needs to move up and down by a stroke before continuing to print.

In an embodiment, a release device includes a fixing member, a release film, a support plate, a soft rubber ring and an exhaust device.

The fixing member is arranged to be fixed to the release film. The soft rubber ring is arranged between the release film and the support plate at edges of the release film and the support plate. A cavity is enclosed by the release film, the support plate, and the soft rubber ring together. And the support plate is provided with a first through hole. The exhaust device is connected to the cavity through a wall of the first through hole.

In other embodiments, the exhaust device includes a connection component and an air pump.

A first end of the connection component connects the cavity through the wall of the first through hole. A second end of the connection component connects the air pump.

In an embodiment, the fixing member includes a first fixing plate, a second fixing plate and a plurality of bolts.

The first fixing plate and the second fixing plate are arranged opposite to each other; the first fixing plate is arranged at a top surface of the release film. The second fixing plate is arranged at a bottom surface of the release film. The first fixing plate is fixed to the second fixing plate by means of the plurality of bolts.

Optionally, the first fixing plate includes a plurality of first threaded holes that are uniformly distributed in the first fixing plate. The second fixing plate includes a plurality of second threaded holes that are uniformly distributed in the second fixing plate. The plurality of first threaded holes is corresponding connected to the plurality of second threaded holes.

Optionally, the first fixing plate and the second fixing plate are both annular steel rings.

Optionally, the support plate is made of frosted glass.

An embodiment of the present application provides a printing apparatus. The printing apparatus includes a release device mentioned above, a resin vat housing, and a working platform.

The resin vat housing is arranged at a top surface of the release device and is connected to the fixing member of the release device via a first plurality of bolts. The working platform is arranged at a bottom surface of the release device and is fixedly connected to the resin vat housing via the first plurality of bolts.

Optionally, a top surface of the working platform is provided with a liquid crystal display screen. The release device is located at a top surface of the liquid crystal display screen and has a dimension greater than that of the liquid crystal display screen or has a dimension equal to that of the liquid crystal display screen.

Optionally, the exhaust device includes a connection component and an air pump.

The working platform is provided with a second through hole in communication with the first through hole. And the first end of the connection component is arranged at the second through hole.

Optionally, the connection component includes a soft rubber air nozzle, a hose fitting, and a hose.

The soft rubber air nozzle is arranged at the second through hole, a first end of the hose is connected to the soft rubber air nozzle via the hose fitting, and a second end of the hose is connected to the air pump.

In the embodiment of the present disclosure, the release device includes: a fixing member, a release film, a support plate, a soft rubber ring, and an exhaust device. The fixing member is arranged to be fixed to the release film. The soft rubber ring is arranged between the release film and the support plate at edges of the release film and the support plate. A cavity is enclosed by the release film, the support plate, and the soft rubber ring together. And the support plate is provided with a first through hole through which the exhaust device is in communication with the cavity. In this way, as a cavity is enclosed by the release film, the soft rubber ring, and the support plate, during printing, air in the cavity can be exhausted by the exhaust device, such that the release film can be attached downward to the support plate. An upward movement of a printing model would not cause an upward deformation of the release film. The printing model can thus be smoothly released from the release film without the need for a large distance movement. The situation where the next layer can only continue to be printed after the printing assembly moves up and down by a certain stroke is avoided. Instead, after the printing of the current layer is completed, printing can continue by directly lifting the printing model up to the height of the next layer, thereby reducing the time for printing and improves the printing efficiency.

DETAILED DESCRIPTION OF THE EMBODIMENTS

The technical solutions of the embodiments of the present invention will be clearly and completely described below with reference to the accompanying drawings for the embodiments of the present invention. Obviously, the embodiments described are some, rather than all, of the embodiments of the present invention. All other embodiments obtained by those of ordinary skill in the art based on the embodiments of the present invention without any inventive effort shall fall within the scope of protection of the present invention.

Figure 1:
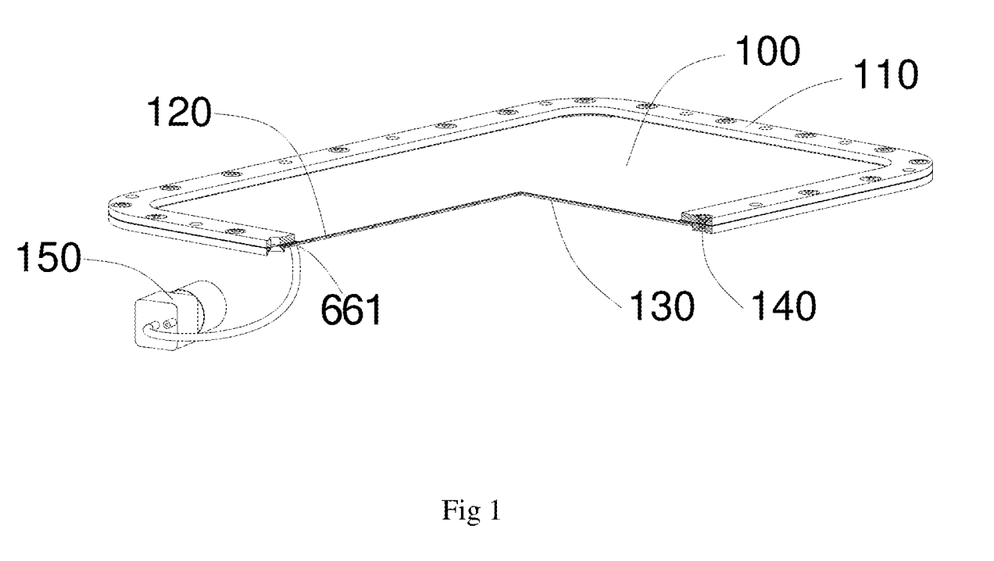
FIG. 1 is an embodiment of a structural schematic diagram of a release device.

FIG. 1 is a structural schematic diagram of the release device in the embodiment. As shown in FIG. 1, the release device 100 includes: a fixing member 110, a release film 120, a support plate 130, a soft rubber ring 140, and an exhaust device 150.

The fixing member 110 is arranged to be fixed to the release film 120. The soft rubber ring 140 is arranged between the release film 120 and the support plate 130, and the soft rubber ring 140 is arranged at edges of the release film 120 and the support plate 130. A cavity is enclosed by the release film 120, the support plate 130, and the soft rubber ring 140 together. The support plate 130 is provided with a first through hole 661 through which the exhaust device 150 is in communication with the cavity. The first through hole 661 connects to the cavity.

It should be noted that the fixing member 110 is configured to fix the release film 120, such that unnecessary deformation of the release film 120 due to the small thickness thereof can be effectively prevented. The fixing member 110 needs to have a shape adapted to a shape of the release film 120, which is not specifically limited in the present application. In an embodiment, in order not to affect the use effect of the release film 120, a contact portion between the fixing member 110 and the release film 120 is located at edges of the release film 120. For example, if the release film 120 is rectangular, the fixing member 110 can be a rectangular frame. The support plate 130 is configured to enclose the cavity together with the release film 120 and the soft rubber ring 140 and may also be configured to support the release film 120 during the operation of the exhaust device 150, to prevent the acting force generated from causing a large downward deformation of the release film 120 when the air in the cavity is vented by the exhaust device 150. The downward deformation of the release film 120 can be limited. In order not to affect the printing effect, the support plate 130 can be made of a transparent material, such as glass, to prevent the support plate 130 from blocking ultraviolet light. In the embodiment, the support plate 130 includes a first through hole 661 connecting to the exhaust device, to communicate with the exhaust device. The exhaust device can be in detachable connection with the first through hole 661 or can be connection with the first through hole 661 in an integrated molding process, which is not specifically limited in the embodiment.

Figure 2:
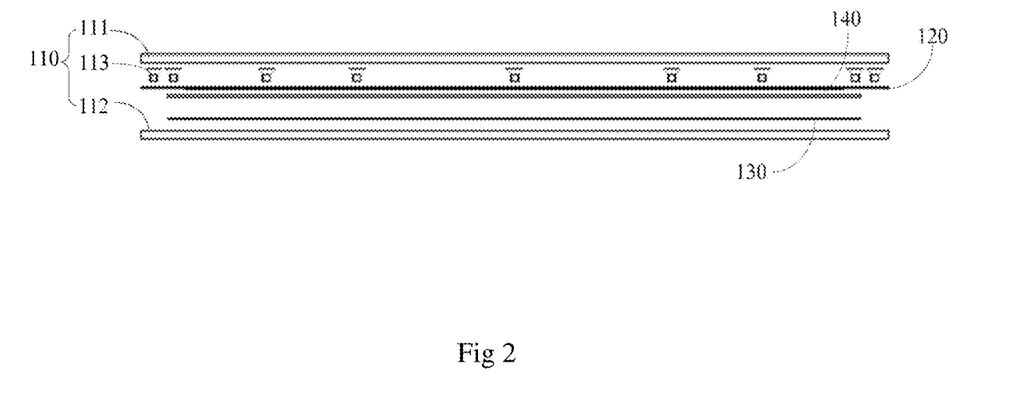
FIG. 2 is an exploded view of a fixing member, a release film, a soft rubber ring, and a support plate of the release device provided in an embodiment.

In an embodiment, positional relationship between the fixing member 110, the release film 120, the soft rubber ring 140 and the support plate 130 can be shown in FIG. 2. FIG. 2 is an exploded view of the fixing member, the release film, the soft rubber ring, and the support plate of the release device. The fixing member 110 is arranged to be fixed to the release film 120, and the fixing member 110 can be arranged to be fixed to the release film 120 by means of a plurality of bolts, fasteners, and/or hinges, etc., which is not specifically limited in the present embodiment. The soft rubber ring 140 is located between the release film 120 and the support plate 130, that is, the soft rubber ring 140 is located between a bottom surface of the release film 120 and at a top surface of the support plate 130. As the soft rubber ring 140 is arranged at the edges of the release film 120 and the support plate 130, a cavity is enclosed by the release film 120, the support plate 130, and the soft rubber ring 140 together.

During the assembly process, it is necessary to fix the release film 120 to the fixing member 110 at first. Then the soft rubber ring 140 is arranged at the bottom surface of the release film 120, and then the support plate 130 is fixedly connected to the release film 120 via the soft rubber ring 140. In this way, a cavity is enclosed by the release film 120, the support plate 130, and the soft rubber ring 140 together.

When the exhaust device 150 is operating, the release film 120 is subjected to the acting force generated by the exhaust device 150 during exhausting, causing the release film 120 to be attached to the support plate 130 below. In this way, during printing, the printing model can be smoothly released from the release film 120 without the need for a large distance movement. The situation where the next layer can only continue to be printed after a printing assembly 400 moves up and down by a certain stroke is avoided. Instead, after the printing of the current layer is completed, printing can continue by directly lifting the printed model up to the height of the next layer, thereby improving the printing efficiency.

Since a release film 120 of a general printing apparatus is generally directly arranged on a liquid crystal display screen of a working platform 300, when the printing model is released from the release film 120, the upward deformation of the release film 120 can be caused due to the presence of an attachment force between the printing model and the release film 120. Therefore, every time the printing of a layer is completed, the printing assembly 400 needs to move up by a certain height to completely release the printing model from the release film 120. For example, the printing assembly 400 needs to move up by a height of 10 mm to ensure that the printing model is released from the release film 120, and that each layer has a height of 5 mm, in order to make a model printed by the general printing apparatus be completely released from the release film 120, the printing assembly 400 has to move up by 10 mm and then move down by 5 mm, then the printing assembly 400 can continue to print the next layer. In this way, the printing assembly 400 has to move up and down by a total stroke of 15 mm to continue to print the next layer every time the printing of a layer is completed. More time is needed. When applying the printing apparatus of the present embodiment, the exhaust device 150 exhausts the air from the cavity during printing to bring the cavity into a vacuum state. In this way, the release film 120 is subjected to the acting force generated by the exhaust device 150 during exhausting, and the release film 120 is thus attached to the support plate 130 below. The release film 120 will not deform upward due to the attachment force between the release film 120 and the printing model. The release film 120 is tightly attached to the support plate 130. In this way, once the printing model moves upward, the printing model can be smoothly released from the release film 120. Therefore, with the printing apparatus of the present embodiment, the printing assembly 400 can directly move up by 5 mm to print the next layer after the printing of a layer is completed, without the need for moving by an extra stroke. Therefore, comparing with the general printing apparatus, the printing apparatus of the present embodiment can reduce the movement stroke of the printing assembly 400. This can not only ensure that the printing model is released from the release film 120 to ensure the printing quality, but also reduce the time for printing and improve the printing efficiency.

Figure 3:
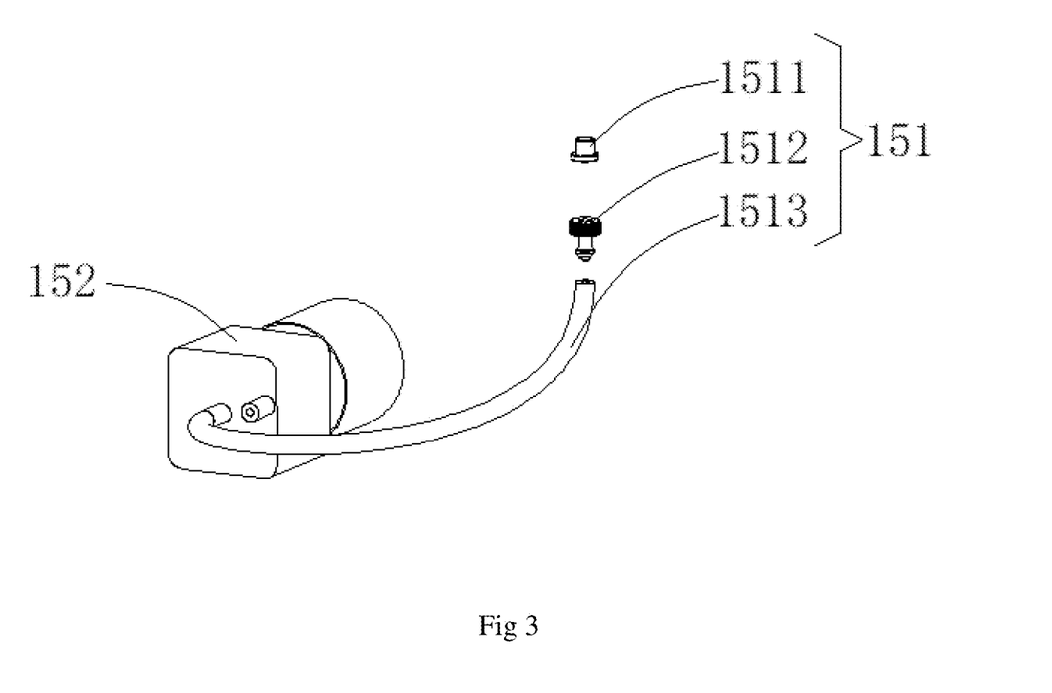
FIG. 3 is a structural schematic diagram of an exhaust device provided in an embodiment.

Further, referring to FIG. 3, FIG. 3 is a structural schematic diagram of the exhaust device provided in an embodiment. The exhaust device 150 includes a connection component 151 and an air pump 152. A first end of the connection component 151 is in communication with the first through hole 661. And a second end of the connection component 151 is in communication with the air pump 152. That is, the first end of the connection component 151 is connected to the first through hole 661. The second end of the connection component 151 is connected to the air pump 152.

Specifically, the first end of the connection component 151 has a shape adapted to that of the first through hole 661, such that it is possible to communicate the first end of the connection component 151 with the first through hole 661. In addition, the second end of the connection component 151 is in communication with the air pump 152, such that it is possible to communicate the air pump 152 with the cavity through the connection component 151. When the air pump 152 is operating, the air pump 152 can pump air out of the cavity.

Further, referring to FIG. 2, the fixing member 110 includes a first fixing plate 111, a second fixing plate 112, and a plurality of bolts 113.

The first fixing plate 111 and the second fixing plate 112 are arranged opposite to each other, the first fixing plate 111 is arranged at a top surface of the release film 120, the second fixing plate 112 is arranged at a bottom surface of the release film 120, and the first fixing plate 111 is fixed to the second fixing plate 112 by means of the plurality of bolts 113.

Specifically, the first fixing plate 111 and the second fixing plate 112 can be two fixing plates that are symmetrical or can be two fixing plates that are not symmetrical vertically, which is not specifically limited in the present embodiment. The first fixing plate 111 and the second fixing plate 112 are respectively arranged on two opposite sides of the release film 120, such that when the first fixing plate 111 is fixed and locked to the second fixing plate 112, the release film 120 can be fixedly arranged on the fixing member 110. The first fixing plate 111 can be fixed to the second fixing plate 112 by the plurality of bolts 113. This facilitates a user to replace and maintain the release film 120 in the future.

In another embodiment, the first fixing plate 111 may also be fixed to the second fixing plate 112 by means of hinges, fasteners, etc., which is not specifically limited in the present application.

Further, the first fixing plate 111 includes a plurality of first threaded holes that are uniformly distributed in the first fixing plate 111. The second fixing plate 112 includes a plurality of second threaded holes that are uniformly distributed in the second fixing plate 112. The plurality of first threaded holes correspondingly communicates with the plurality of second threaded holes.

In an embodiment, the first fixing plate 111 may include a plurality of first threaded holes that are uniformly distributed, the second fixing plate 112 may include a plurality of second threaded holes that are uniformly distributed, and the first threaded holes communicate with the second threaded holes. In this way, the plurality of bolts 113 can be used to fix the first fixing member 110 to the second fixing member 110 with uniformly distributed fixing positions. This facilitates the further fixing of the release film 120 and effectively prevents an external force from causing an unnecessary deformation of the release film 120.

Further, the first fixing plate 111 and the second fixing plate 112 are both annular steel rings.

Specifically, the annular steel rings serve as the first fixing plate 111 and the second fixing plate 112, such that the first fixing plate 111 and the second fixing plate 112 can fix the periphery of the release film 120 and can have a function of fixing the release film 120. In an embodiment, the first fixing plate 111 has a greater width than the width of the second fixing plate 112, and the portion of the first fixing plate 111 that extends beyond the second fixing plate 112 can be configured to have the soft rubber ring 140 provided thereon. In this way, the support plate 130 is fixed by the soft rubber ring 140 arranged at the periphery of the release film 120. This can effectively reduce the occupancy rate of the soft rubber ring 140 on the release film 120 and improve the overall aesthetic appearance.

Further, support plate 130 is made of frosted glass.

In an embodiment, the support plate 130 is made of frosted glass. Because of the high light transmittance of glass, it can be ensured that the ultraviolet light emitted by an ultraviolet lamp can be transmitted through the glass, and since a surface of the frosted glass has a certain force of friction, when the printing assembly 400 drives the printing model to move upward, the force of friction between the release film 120 and the frosted glass is much greater than the adhesion between the printing model and the release film 120, and the printing model will not easily adhesively remove the release film 120, affecting the printing quality.

Figure 4:
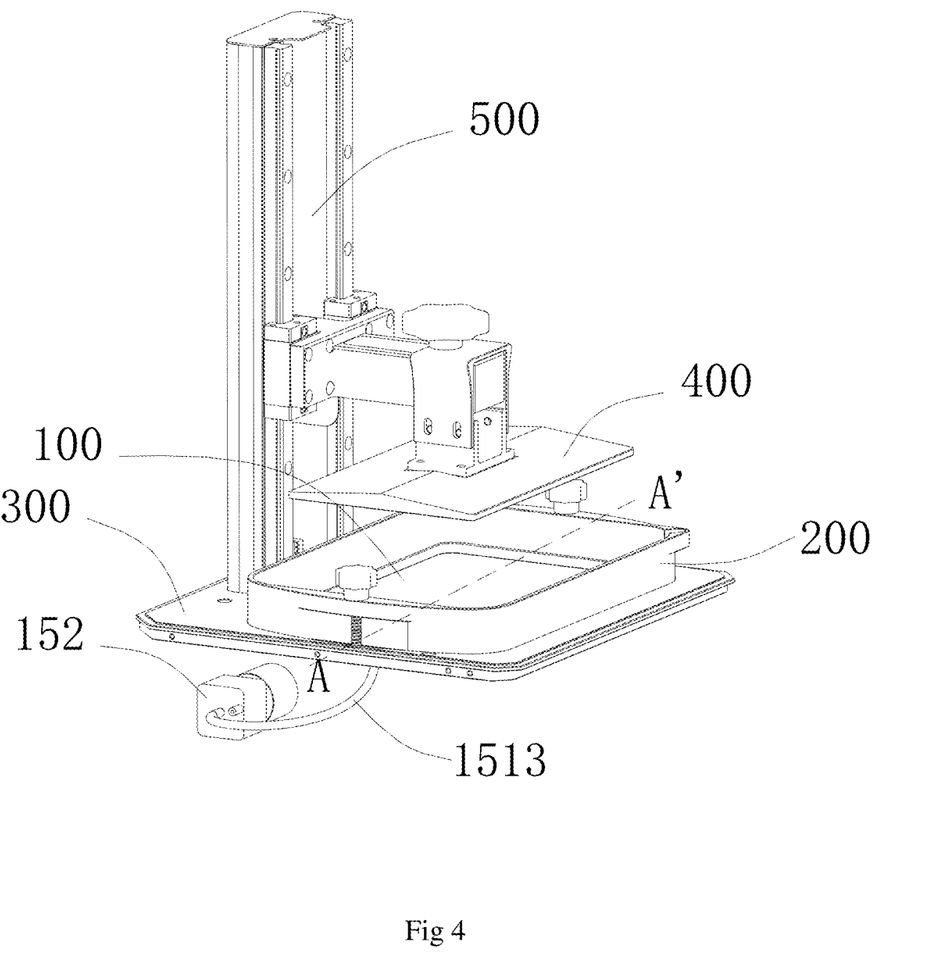
FIG. 4 is a structural schematic diagram of a printing apparatus provided in an embodiment.

Furthermore, an embodiment of the present application provides a printing apparatus. Referring to FIG. 4, FIG. 4 is a structural schematic diagram of the printing apparatus provided in the embodiment of the present application. As shown in FIG. 4, the printing apparatus includes the release device 100 as described above, a resin vat housing 200, and a working platform 300.

The resin vat housing 200 is arranged at a top surface of the release device 100, and the resin vat housing 200 is connected to the fixing member 110 of the release device 100 via a first plurality of bolts.

The working platform 300 is arranged at a bottom surface of the release device 100, and the working platform 300 is fixedly connected to the resin vat housing 200 via a second plurality of bolts.

Specifically, the resin vat housing 200 is arranged at the top surface of the release device 100, both of the resin vat housing 200 and the fixing member 110 in the release device 100 have threaded holes, and the resin vat housing 200 can be fixed to the fixing member 110 via the first plurality of bolts, such that the resin vat housing 200 is fixed to the top surface of the release device 100 for holding a resin required for printing. In this way, during the operation of the printing apparatus, the printing assembly 400 above the resin vat housing 200 can move under the drive of a transmission assembly 500, and cures the resin in a container enclosed by the resin vat housing 200 and the release film 120, to print the printing model layer by layer.

The working platform 300 is arranged at the bottom surface of the release device 100. Since both of the resin vat housing 200 and the working platform 300 have threaded holes, the resin vat housing 200 can be fixedly connected to the working platform 300 via the second plurality of bolts to fix both the resin vat housing 200 and the release device 100 to a top surface of the working platform 300.

As the cavity is enclosed by the release film 120, the soft rubber ring 140, and the support plate 130 together, during the operation of the exhaust device 150, the air in the cavity can be exhausted by the exhaust device 150. The release film 120 is subjected to the acting force generated by the exhaust device 150 during exhausting, deforms downward, and is attached to the support plate 130 below the release film 120. In this way, during printing, the air in the cavity can be exhausted by the exhaust device 150, such that the release film 120 can be attached to the support plate 130, the printing model can thus be smoothly released from the release film 120, and the situation where the next layer can only continue to be printed after the printing assembly 400 moves up and down by a certain stroke is avoided, thereby improving the printing efficiency.

Further, the top surface of the working platform 300 is provided with a liquid crystal display screen (not labeled in the figures).

The release device 100 is located at a top surface of the liquid crystal display screen, and the release device 100 has a dimension greater than that of the liquid crystal display screen, or has a dimension equal to that of the liquid crystal display screen.

In an embodiment, the release device 100 is located at the top surface of the liquid crystal display screen, and the release device 100 has a dimension greater than that of the liquid crystal display screen, or has a dimension equal to that of the liquid crystal display screen, such that when an image of a layer is displayed on the liquid crystal display screen, the release device 100 will not block the image of the layer, so as to prevent the occurrence of printing failure. In addition, the support plate 130 is arranged below the release film 120 in the release device 100, such that even if the release film 120 is aged or is melted at high temperature, the resin in the container will not drip onto the liquid crystal display screen and cause the liquid crystal display screen unusable, thereby enhancing the safety of the liquid crystal display screen.

Figure 5:
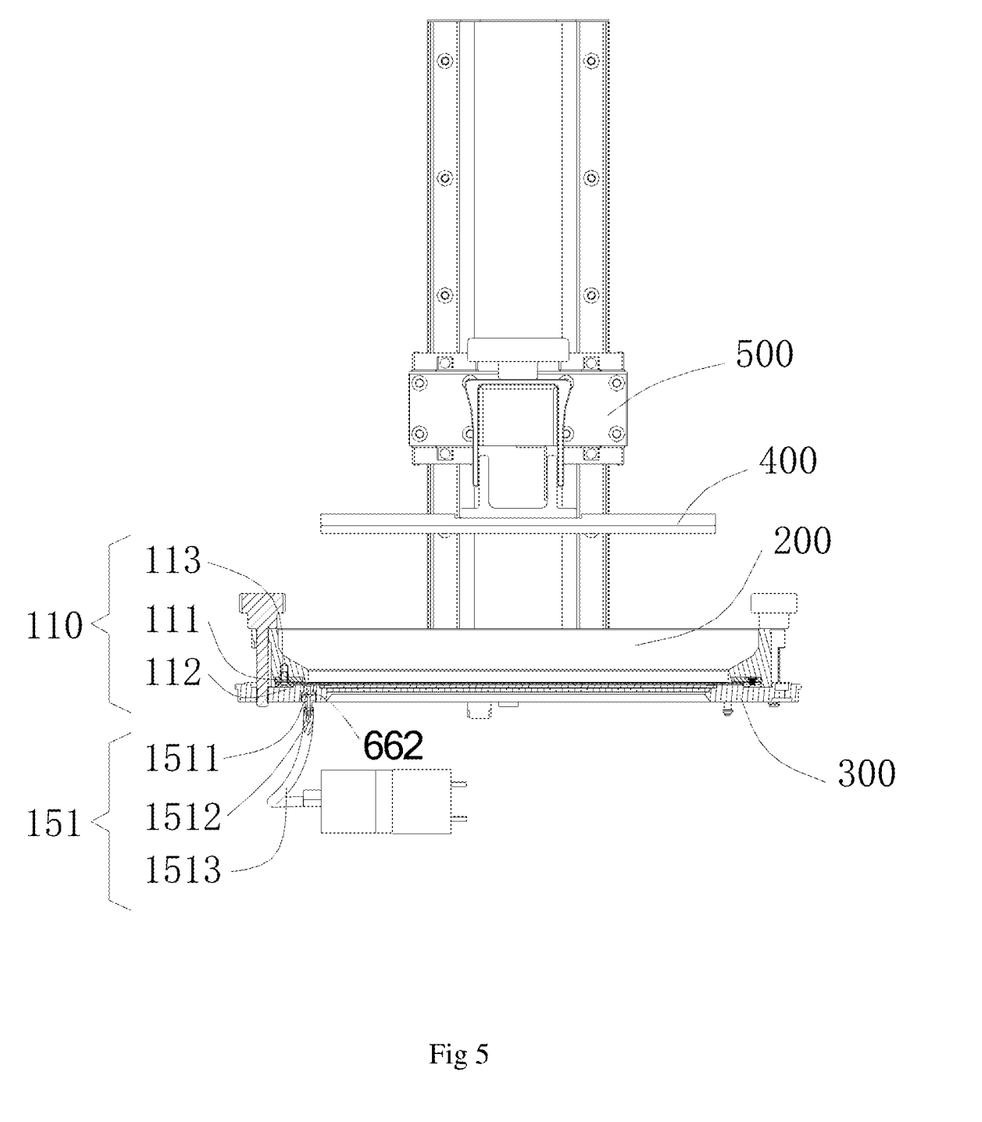
FIG. 5 is a sectional view of the printing apparatus provided in an embodiment.

Further, referring to FIG. 5, FIG. 5 is a sectional view of the printing apparatus provided in the embodiment of the present application. FIG. 5 is a sectional view of the printing apparatus of FIG. 4 along the line AA'. As shown in FIG. 5, the exhaust device 150 includes a connection component 151 and an air pump 152. A first end of the connection component 151 is in communication with a cavity through a first through hole 661, and a second end of the connection component 151 is in communication with the air pump 152. That is, the first end of the connection component 151 is connected to a cavity through the first through hole 661, and the second end of the connection component 151 is connected to the air pump 152.

The working platform 300 is provided with a second through hole 662 in communication with the first through hole 661, and the first end of the connection component 151 is arranged at the second through hole 662.

In an embodiment, the first through hole 661 mentioned above is located in the support plate 130, the second through hole 662 mentioned above is located in the working platform 300, and the cavity mentioned above is a cavity enclosed by the release film 120, the support plate 130 and the soft rubber ring 140 together and is in communication with both the first through hole 661 and the second through hole 662.

Since the release device 100 is directly arranged at the top surface of the working platform 300, the support plate 130 of the release device 100 is in direct contact with the working platform 300. During assembling, the first through hole 661 in the support plate 130 is aligned with the second through hole 662 in the working platform 300, such that the second through hole 662 is in communication with the first through hole 661. In this way, the connection component 151 of the exhaust device 150 is arranged in the second through hole 662 to communicate with the first through hole 661 and the air pump 152. It should be noted that due to the limitation of the thickness of the support plate 130, if the first end of the connection component 151 is directly arranged at the first through hole 661, the connection and sealing requirements therefore can be difficult to meet, so that arranging the first end of the connection component 151 at the second through hole 662 of the working platform 300 can further improve the sealing of the cavity from the outside.

Further, the connection component 151 includes a soft rubber air nozzle 1511, a hose fitting 1512 and a hose 1513.

The soft rubber air nozzle 1511 is arranged at the second through hole 662, a first end of the hose 1513 is connected to the soft rubber air nozzle 1511 via the hose fitting 1512, and a second end of the hose 1513 is connected to the air pump 152.

In this embodiment, the exhaust device 150 is in communication with the first through hole 661. The exhaust device 150 is connected to the first through hole 661, and the exhaust device 150 is detachable from the first through hole 661. Specifically, the exhaust device 150 can be detachable from the first through hole 661 by means of using the soft rubber air nozzle 1511 and the hose fitting 1512. During assembling, the soft rubber air nozzle 1511 can be first mounted in the second through hole 662 that is vertically connected to the first through hole 661 of the support plate. Then the hose fitting 1512 is pressed into the second through hole 662 to bring the soft rubber air nozzle 1511 into close contact with the hose fitting 1512, and then the first end of the hose 1513 is inserted into the hose fitting 1512. The second end of the hose 1513 is inserted into the air pump 152 to complete the assembly process. In this way, the soft rubber air nozzle 1511 and the hose fitting 1512 are arranged in the second through hole 662 and are used as a connection component between the first through hole 661 and the hose 1513, such that the exhaust device 150 is detachably connected.

The above-mentioned embodiments are described with reference to the accompanying drawings, other different forms and embodiments are also possible without departing from the principle of the present invention. Therefore, the present invention should not be constructed as a limitation to the embodiments presented herein. More precisely, these embodiments are provided such that the present invention will be thorough and complete, and will convey the scope of the present invention to those skilled in the art. In the drawings, the dimensions and relative dimensions of the components can be exaggerated for the sake of clarity. The terms used herein are only for the purpose of describing specific embodiments and are not intended to be limiting. The terms "comprising" and/or "including", when used in this specification, mean the presence of stated features, integers, members, and/or components, but do not exclude the presence or addition of one or more other features, integers, members, components, and/or groups thereof.

Unless otherwise indicated, a range of values, when recited, includes the upper and lower limits of the range and any sub-ranges therebetween.

The embodiments described above are the preferred embodiments of the present invention. It should be noted that for a person of ordinary skill in the art, several improvements and modifications can be made without departing from the principle of the present invention, and these improvements and modifications also fall within the scope of protection of the present invention.

What is claimed is:

1. A release device, comprising:
    a fixing member;
    a release film;
    a support plate;
    a soft rubber ring; and
    an exhaust device;
    wherein the fixing member is arranged to be fixed to the release film;
    wherein the soft rubber ring is arranged between a bottom surface of the release film and a top surface of the support plate at peripheries of the release film and the support plate;
    wherein a cavity is enclosed by the release film, the support plate, and the soft rubber ring together, wherein the cavity is defined within the peripheries of the release film and the support plate, wherein the soft rubber ring is arranged about the peripheries of the release film and the support plate;
    wherein the support plate is provided with a first through hole, wherein the first through hole is arranged in the periphery of the support plate;
    wherein the exhaust device is connected to communicate with the cavity through the first through hole provided in the periphery of the support plate, and
    wherein the fixing member comprises a first fixing plate, a second fixing plate and a plurality of bolts;
        the first fixing plate and the second fixing plate are arranged opposite to each other, the first fixing plate is arranged at a top surface of the release film, the support plate is arranged at a bottom surface of the soft rubber ring and at a top surface of the second fixing plate; and
        the first fixing plate is fixed to the second fixing plate via the plurality of bolts.

2. The release device according to claim 1, wherein the exhaust device comprises a connection component and an air pump, a first end of the connection component is in communication with the cavity through the first through hole, and a second end of the connection component is in communication with the air pump.

3. The release device according to claim 1, wherein:
    the first fixing plate comprises a plurality of first threaded holes, the plurality of first threaded holes is uniformly distributed in the first fixing plate;
    the second fixing plate comprises a plurality of second threaded holes, the plurality of second threaded holes is uniformly distributed in the second fixing plate; and
    the plurality of first threaded holes are correspondingly connected to the plurality of second threaded holes.

4. The release device according to claim 1, wherein the first fixing plate and the second fixing plate are both annular steel rings.

5. The release device according to claim 1, wherein the support plate is made of frosted glass.

6. A printing apparatus, comprising:
    a release device, wherein the release device comprises a fixing member, a release film, a support plate, a soft rubber ring and an exhaust device, the fixing member is arranged to be fixed to the release film; the soft rubber ring is arranged between a bottom surface of the release film and a top surface of the support plate at peripheries of the release film and the support plate, a cavity is enclosed by the release film, the support plate and the soft rubber ring together, wherein the cavity is defined within the peripheries of the release film and the support plate, wherein the soft rubber ring is arranged about the peripheries of the release film and the support plate,
    wherein the support plate is provided with a first through hole, wherein the first through hole is arranged in the periphery of the support plate, and wherein the exhaust device is connected to communicate with the cavity through the first through hole provided in the periphery of the support plate;
    a resin vat housing, wherein the resin vat housing is arranged at a top surface of the release device, and the resin vat housing is connected to the fixing member of the release device via a first plurality of bolts; and
    a working platform, wherein the working platform is arranged at a bottom surface of the release device, and the working platform is fixedly connected to the resin vat housing via a second plurality of bolts;
    wherein the fixing member comprises a first fixing plate, a second fixing plate, and a third plurality of bolts, and
    wherein the first fixing plate and the second fixing plate are arranged opposite to each other, the first fixing plate is arranged at a top surface of the release film, the support plate is arranged at a bottom surface of the soft rubber ring and at a top surface of the second fixing plate, and the first fixing plate is fixed to the second fixing plate via the third plurality of bolts.

7. The printing apparatus according to claim 6, wherein the exhaust device comprises a connection component and an air pump; and
    wherein a first end of the connection component is in communication with the cavity through the first through hole, and a second end of the connection component is in communication with the air pump.

8. The printing apparatus according to claim 6, wherein the first fixing plate comprises a plurality of first threaded holes, the plurality of first threaded holes is uniformly distributed in the first fixing plate; the second fixing plate comprises a plurality of second threaded holes, the plurality of second threaded holes are uniformly distributed in the second fixing plate; and the plurality of first threaded holes are correspondingly connected to the plurality of second threaded holes.

9. The printing apparatus according to claim 6, wherein the first fixing plate and the second fixing plate are both annular steel rings.

10. The printing apparatus according to claim 6, wherein the support plate is made of frosted glass.

11. The printing apparatus according to claim 6, wherein a top surface of the working platform is provided with a liquid crystal display screen, the release device is located at a top surface of the liquid crystal display screen, the release device has a dimension greater than that of the liquid crystal display screen or the release device has a dimension equal to that of the liquid crystal display screen.

12. The printing apparatus according to claim 6, wherein the exhaust device comprises a connection component and an air pump, a first end of the connection component is connected to a cavity through the first through hole, and a second end of the connection component is connected to the air pump, the working platform is provided with a second through hole connected to the first through hole, the first end of the connection component is arranged at the second through hole.

13. The printing apparatus according to claim 12, wherein the connection component comprises a soft rubber air nozzle, a hose fitting, and a hose, the soft rubber air nozzle is arranged at the second through hole, a first end of the hose is connected to the soft rubber air nozzle via the hose fitting, and a second end of the hose is connected to the air pump.

14. The release device according to claim 1, wherein the first through hole is arranged to align with a second through hole of a working platform of a printing apparatus.

15. The release device according to claim 1, wherein the exhaust device is configured to provide negative pressure to the release film during separation of a printing model from the release film to prevent deformation of the release film.

16. The printing apparatus according to claim 6, wherein the exhaust device is configured to provide negative pressure to the release film during separation of a printing model from the release film to prevent deformation of the release film.

\* \* \* \* \*